US012486739B2

(12) United States Patent
El Mallawany et al.

(10) Patent No.: US 12,486,739 B2
(45) Date of Patent: Dec. 2, 2025

(54) FLUID FLOW CONTROL SYSTEM EMPLOYING A FLUIDIC DIODE FOR CONTROL PRESSURE

(71) Applicant: Halliburton Energy Services, Inc., Houston, TX (US)

(72) Inventors: Ibrahim El Mallawany, Al-Khobar (SA); Michael Linley Fripp, Singapore (SG); Stephen Michael Greci, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 67 days.

(21) Appl. No.: 18/460,925

(22) Filed: Sep. 5, 2023

(65) Prior Publication Data

US 2025/0075598 A1 Mar. 6, 2025

(51) Int. Cl.
*E21B 43/12* (2006.01)
*F15C 1/16* (2006.01)

(52) U.S. Cl.
CPC ................ *E21B 43/12* (2013.01); *F15C 1/16* (2013.01)

(58) Field of Classification Search
CPC ........................................................ E21B 43/12
See application file for complete search history.

(56) References Cited

U.S. PATENT DOCUMENTS 8,584,762 B2 11/2013 Fripp et al.
9,683,429 B2 6/2017 Mathiesen et al.
11,041,361 B2 6/2021 Fripp et al.
11,131,161 B2 9/2021 Fripp et al.
11,280,168 B2 3/2022 Greci et al.
2011/0186300 A1 8/2011 Dykstra et al.
2015/0021019 A1* 1/2015 Veit ......................... E21B 43/08 166/250.15
2015/0034333 A1 2/2015 Fripp et al.
2015/0060084 A1 3/2015 Moen et al.
2016/0366785 A1 12/2016 Barron et al.
2018/0245428 A1* 8/2018 Richards ................. E21B 47/12
2019/0120048 A1* 4/2019 Coffin ................ G01N 33/2823
2019/0195047 A1 6/2019 Rong et al.
(Continued)

FOREIGN PATENT DOCUMENTS

EP 2620587 A2 7/2013

*Primary Examiner* — David Carroll
(74) *Attorney, Agent, or Firm* — Scott Richardson; Parker Justiss, P.C.

(57) ABSTRACT

Provided is a fluid flow control system, a well system, and a method. The fluid flow control system, in one aspect, includes a flow restrictor operable to receive production fluid having a pressure (P3) and discharge control fluid having a control pressure (P2), and a fluidic diode placed between the flow restrictor and the tubing, the fluidic diode configured to increase the control pressure (P2) to a higher control pressure ($P2^{++}$) when the fluidic diode encounters lower viscosity fluids and is configured to increase the control pressure (P2) to a lower control pressure ($P2^{+}$) when the fluidic diode encounters higher viscosity fluids. The fluid flow control system, in one aspect, further includes an inflow control device having a production fluid inlet, a control inlet operable to receive control fluid having the higher control pressure ($P2^{++}$) or the lower control pressure ($P2^{+}$), and a production fluid outlet.

22 Claims, 15 Drawing Sheets

(56) References Cited

U.S. PATENT DOCUMENTS

| | | | |
|---|---|---|---|
| 2021/0355787 | A1 | 11/2021 | Fripp et al. |
| 2022/0195850 | A1 | 6/2022 | El Mallawany et al. |
| 2023/0041355 | A1 | 2/2023 | Brown et al. |
| 2023/0193723 | A1 | 6/2023 | Rong et al. |

* cited by examiner

FLUID FLOW CONTROL SYSTEM EMPLOYING A FLUIDIC DIODE FOR CONTROL PRESSURE

BACKGROUND

In hydrocarbon production wells, it may be beneficial to regulate the flow of formation fluids from a subterranean formation into a wellbore penetrating the same. A variety of reasons or purposes may necessitate such regulation including, for example, prevention of water and/or gas coning, minimizing water and/or gas production, minimizing sand production, maximizing oil production, balancing production from various subterranean zones, and equalizing pressure among various subterranean zones, among others.

A number of devices and/or valves are available for regulating the flow of formation fluids. Some of these devices may be non-discriminating for different types of formation fluids and may simply function as a "gatekeeper" for regulating access to the interior of a wellbore pipe, such as production tubing. Such gatekeeper devices may be simple on/off valves or they may be metered to regulate fluid flow over a continuum of flow rates. Other types of devices for regulating the flow of formation fluids may achieve at least some degree of discrimination between different types of formation fluids. Such devices may include, for example, tubular flow restrictors, nozzle-type flow restrictors, autonomous inflow control devices, non-autonomous inflow control devices, ports, tortuous paths, and combinations thereof.

BRIEF DESCRIPTION

Reference is now made to the following descriptions taken in conjunction with the accompanying drawings, in which.

DETAILED DESCRIPTION

Figure 1:
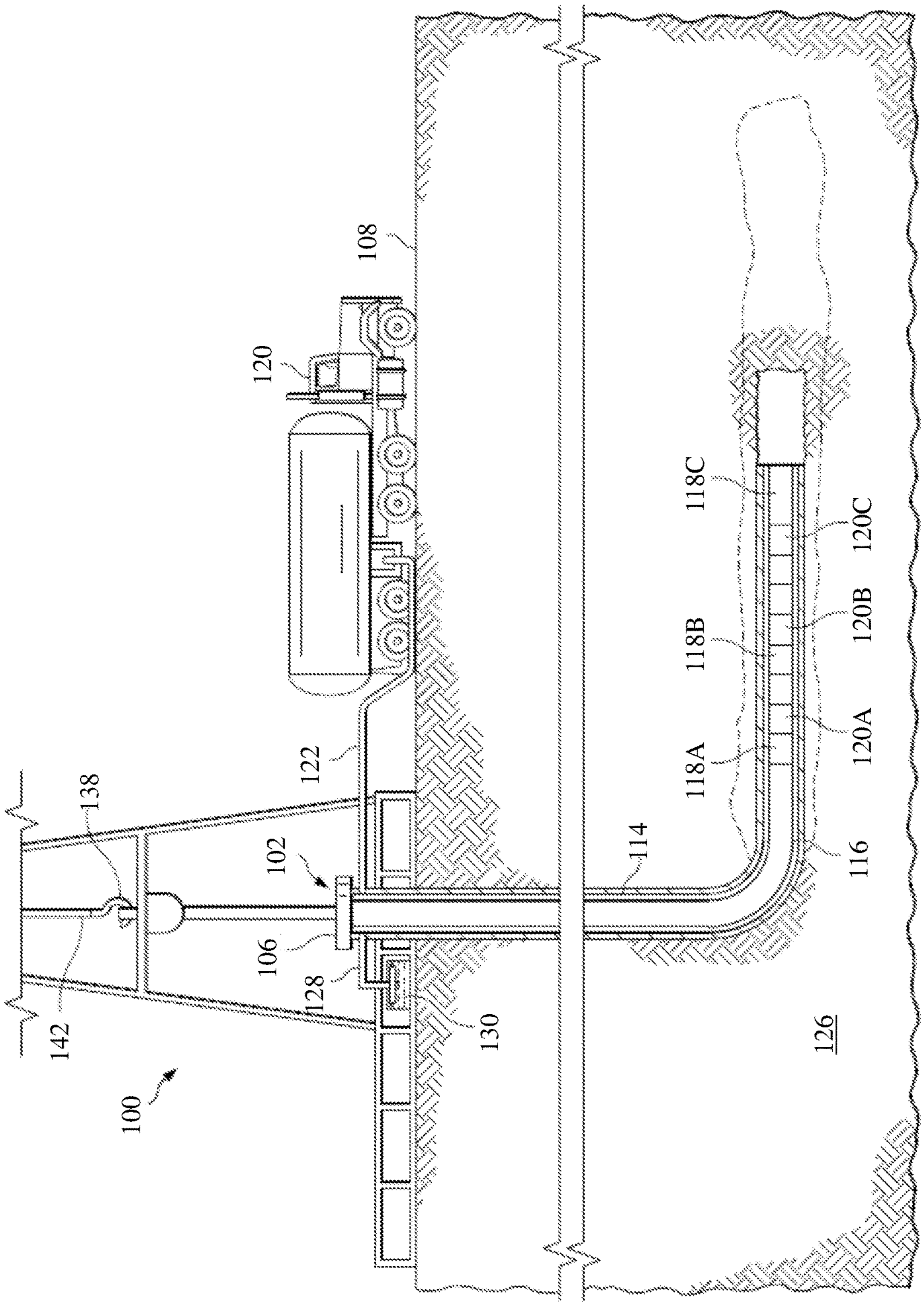
FIG. 1 illustrates a schematic side view of a well system in which fluid flow control systems designed, manufactured and/or operated according to one or more aspects of the disclosure are deployed in a wellbore.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

FIG. 1 illustrates a schematic side view of a well system 100 in which fluid flow control systems 120A-120C designed, manufactured and/or operated according to one or more aspects of the disclosure are deployed in a wellbore 114. As shown in FIG. 1, wellbore 114 extends from surface 108 of well 102 to or through formation 126. A hook 138, a cable 142, traveling block (not shown), and hoist (not shown) may be provided to lower conveyance 116 into well 102. As referred to herein, conveyance 116 is any piping, tubular, or fluid conduit including, but not limited to, drill pipe, production tubing, casing, coiled tubing, and any combination thereof. Conveyance 116 provides a conduit for fluids extracted from formation 126 to travel to surface 108. In some embodiments, conveyance 116 additionally provides a conduit for fluids to be conveyed downhole and injected into formation 126, such as in an injection operation. In some embodiments, conveyance 116 is coupled to production tubing that is arranged within a horizontal section of well 102. In the embodiment of FIG. 1, conveyance 116 and the production tubing are represented by the same tubing.

At wellhead 106, an inlet conduit 122 is coupled to a fluid source 120 to provide fluids through conveyance 116 downhole. For example, drilling fluids, fracturing fluids, and injection fluids are pumped downhole during drilling operations, hydraulic fracturing operations, and injection operations, respectively. In the embodiment of FIG. 1, fluids are circulated into well 102 through conveyance 116 and back toward surface 108. To that end, a diverter or an outlet conduit 128 may be connected to a container 130 at the wellhead 106 to provide a fluid return flow path from wellbore 114. Conveyance 116 and outlet conduit 128 also form fluid passageways for fluids, such as hydrocarbon resources to flow uphole during production operations.

In the embodiment of FIG. 1, conveyance 116 includes production tubular sections 118A-118C at different production intervals adjacent to formation 126. In some embodiments, packers (now shown) are positioned on the left and right sides of production tubular sections 118A-118C to define production intervals and provide fluid seals between the respective production tubular section 118A, 118B, or 118C, and the wall of wellbore 114. Production tubular sections 118A-118C include fluid flow control systems 120A-120C, including inflow control devices (ICDs) in certain embodiments. A fluid flow control system controls the volume or composition of the fluid flowing from a production interval into a production tubular section, e.g., 118A. For example, a production interval defined by production tubular section 118A may produce more than one type of fluid component, such as a mixture of oil, water, steam, carbon dioxide, and natural gas. Fluid flow control system 120A, which is fluidly coupled to production tubular section 118A, reduces or restricts the flow of fluid into the production tubular section 118A when the production interval is producing a higher proportion of an undesirable fluid component, such as water, which permits the other production intervals that are producing a higher proportion of a desired fluid component (e.g., oil) to contribute more to the production fluid at surface 108 of well 102. Accordingly, the production fluid has a higher proportion of the desired fluid component. In some embodiments, fluid flow control systems 120A-120C are autonomous inflow control devices (AICD) that permits or restricts fluid flow into the production tubular sections 118A-118C based on fluid density and/or viscosity, without requiring signals from the well's surface by the well operator.

Although the foregoing paragraphs describe employing fluid flow control systems 120A-120C during production, in some embodiments, fluid flow control systems 120A-120C are also utilized during other types of well operations to control fluid flow through conveyance 116. Further, although FIG. 1 depicts each production tubular section 118A-118C having a fluid flow control system 120A-120C, in some embodiments, not every production tubular section 118A-118C has a fluid flow control system 120A-120C. In some embodiments, production tubular sections 118A-118C (and fluid flow control systems 120A-120C) are located in a substantially vertical section additionally or alternatively to the substantially horizontal section of well 102. Further, any number of production tubular sections 118A-118C with fluid flow control systems 120A-120C, including one, are deployable in the well 102. In some embodiments, production tubular sections 118A-118C with fluid flow control systems 120A-120C are disposed in simpler wellbores, such as wellbores having only a substantially vertical section. In some embodiments, fluid flow control systems 120A-120C are disposed in cased wells or in open-hole environments.

In at least one embodiment, one or more of the fluid flow control systems 120A-120C include a flow restrictor operable to receive production fluid having a pressure (P3) and discharge control fluid having a control pressure (P2), as well as a fluidic diode placed between the flow restrictor and a tubing the fluid flow control system is configured to couple to, wherein the fluidic diode is configured to change (e.g., increase) the control pressure (P2) to a higher control pressure ($P2^{++}$) when the fluidic diode encounters lower viscosity fluids and is configured to change (e.g., increase) the control pressure (P2) to a lower control pressure ($P2^{+}$) when the fluidic diode encounters higher viscosity fluids. In at least one embodiment, one or more of the fluid flow control systems 120A-120C further include an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1). In at least one embodiment, the inflow control device configured to close or open the production fluid outlet based upon a pressure values ($P3-P2^{++}-P1$) or ($P3-P2^{+}-P1$).

In at least one other embodiment, one or more of the fluid flow control systems 120A-120C include a fluidic diode operable to receive production fluid having a pressure (P3) and discharge control fluid having a control pressure (P2), as well as a flow restrictor placed between the fluidic diode and a tubing the fluid flow control system is configured to couple to, wherein the flow restrictor is configured to change the control pressure (P2) to a higher control pressure ($P2^{++}$) when the flow restrictor encounters higher viscosity fluids and is configured to change the control pressure (P2) to a lower control pressure ($P2^{+}$) when the flow restrictor encounters lower viscosity fluids. In at least one embodiment, one or more of the fluid flow control systems 120A-120C further include an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1). In at least one embodiment, the inflow control device configured to close or open the production fluid outlet based upon a pressure values ($P3-P2^{++}-P1$) or ($P3-P2^{+}-P1$).

Figure 2:
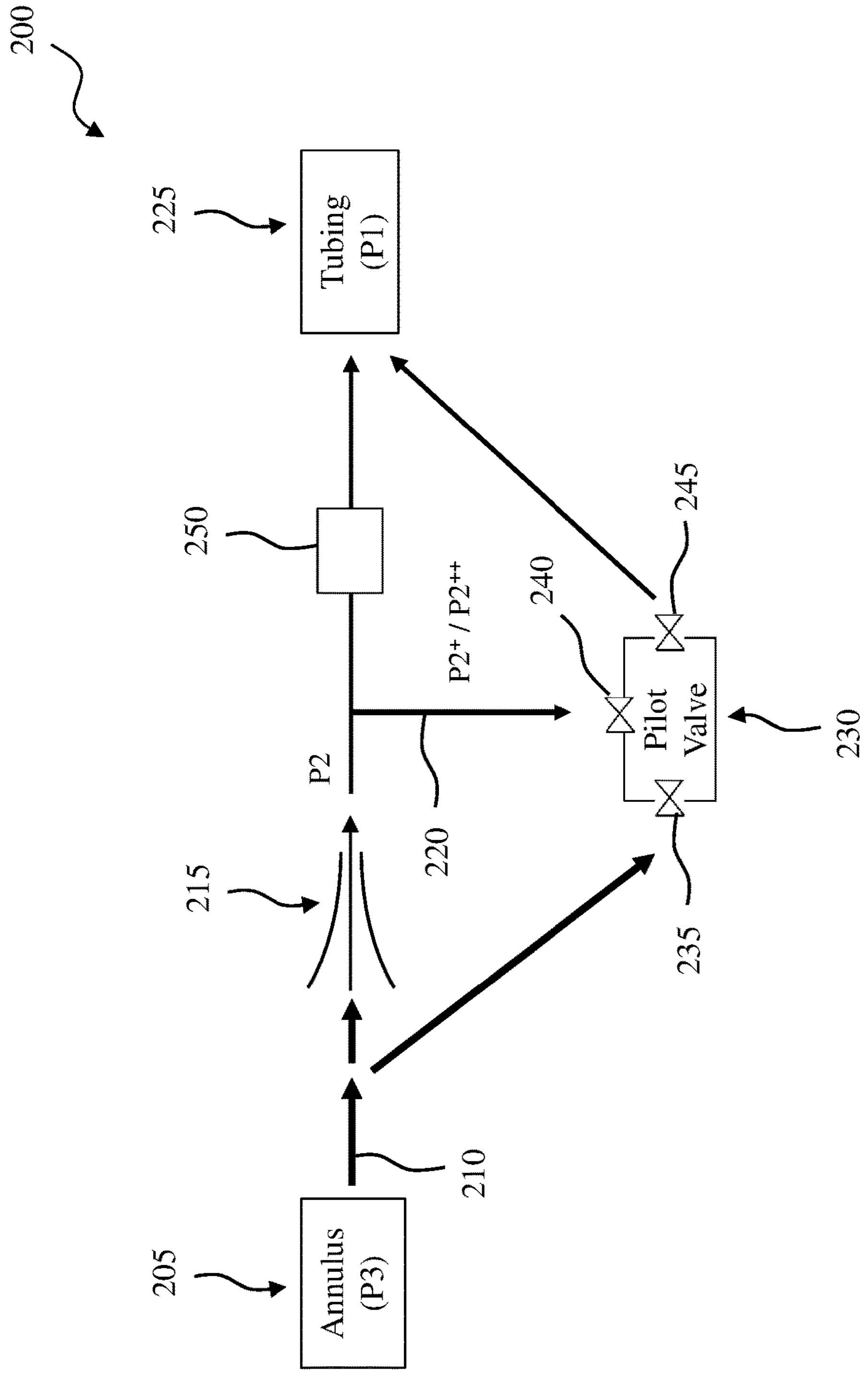
FIG. 2 illustrates a fluid flow control system designed, manufactured and/or operated according to one or more embodiments of the disclosure.

FIG. 2 illustrates a fluid flow control system 200 designed, manufactured and/or operated according to one or more embodiments of the disclosure. The fluid flow control system 200, in at least one embodiment, may include a flow restrictor 215 operable to receive production fluid 210 (e.g., from an annulus 205) having a pressure (P3), and discharge control fluid 220 having a control pressure (P2). The flow restrictor 215, in one other embodiment, may be configured to provide a lower pressure drop across its outlet with lower viscosity fluids (e.g., gas, water, etc.) and a higher pressure drop across its outlet with higher viscosity fluids (e.g., oil). Stated another way, the flow restrictor 215 is configured to provide a greater degree of restriction to higher viscosity fluids (e.g., oil) than lower viscosity fluids (e.g., gas, water, etc.). Accordingly, the control pressure (P2) will vary based upon the type or constituents of fluid passing through the flow restrictor 215. In at least one embodiment, the flow restrictor 215 is a fluid nozzle. In yet another embodiment, however, the flow restrictor 215 is a long restrictive tube.

The long restrictive tube, in one or more embodiments, may have a length at least 5 times its inside diameter. In yet another embodiment, the long restrictive tube has a length at least 25 times its inside diameter, if not at least 50 times its inside diameter. In even yet another embodiment, the long restrictive tube has a length ranging from 10 times to 1000 times its inside diameter. To accommodate certain longer lengths, the long restrictive tube may for formed as a coil, for example coiling around tubing within the wellbore.

The fluid flow control system 200, in one or more embodiments, may further include a fluidic diode 250 placed between the flow restrictor 215 and the tubing 225. The fluidic diode 250, in one or more embodiments and in direct contrast to the flow restrictor 215, easily passes higher viscosity fluids (e.g., oil) to the tubing 225, but reduces the flow of (e.g., chokes off) lower viscosity fluid (e.g., gas, water, etc.) to the tubing 225. Accordingly, when the fluidic diode 250 encounters the lower viscosity fluids, the choking off effect changes a pressure that the control inlet 240 sees to a higher control pressure ($P2^{++}$). This higher control pressure ($P2^{++}$) may, in contrast to the control pressure (P2) (e.g., or the lower control pressure ($P2^{+}$)), be sufficient to close the inflow control device 230, and thus close the bulk flow of fluid from the annulus 205 to the tubing 225 (e.g., a small amount of fluid from an outlet of the fluidic diode 250 may still make its way to the tubing 225). However, when the fluidic diode 250 encounters the higher viscosity fluids, the lack of choking off effect only changes a pressure that the control inlet 240 sees to a lower control pressure ($P2^{+}$). This lower control pressure ($P2^{+}$) may, in contrast to the higher control pressure ($P2^{++}$), be insufficient to close the inflow control device 230, and thus the flow of fluid from the annulus 205 to the tubing 225 remains open.

Thus, in one or more embodiments, the fluidic diode 250 is configured to change the control pressure (P2) to a higher control pressure ($P2^{++}$) when the fluidic diode 250 encounters lower viscosity fluids (e.g., gas, water, etc.) and is configured to change the control pressure (P2) to a lower control pressure ($P2^{+}$) when the fluidic diode encounters higher viscosity fluids (e.g., oil). Accordingly, as the production fluid 210 changes in composition, and thus as a whole becomes less viscous or more viscous, the control pressure (P2) may be adjusted (e.g., automatically adjusted).

A number of different types of fluidic diodes may be used and remain within the scope of the disclosure. In at least one embodiment, the fluidic diode 250 includes no moving parts. In at least one other embodiment, the fluidic diode 250 is a vortex fluid diode. In such an embodiment, the vortex fluid diode more easily passes higher viscosity fluids (e.g., oil), as the vortex provides a more direct path for the higher viscosity fluids to reach an outlet of the vortex fluid diode, and chokes off lower viscosity fluids, as the vortex provides a more indirect path (e.g., circular path) for the lower viscosity fluids to reach the outlet of the vortex fluid diode. Thus, in this embodiment, the more direct path and more indirect path provide for the lower control pressure ($P2^{+}$) and higher control pressure ($P2^{++}$), respectively.

The fluid flow control system 200 may additionally include an inflow control device 230, which in some embodiments may be a pressure operated inflow control device. In at least one embodiment, the inflow control device 230 is a piloted valve (e.g., diaphragm or bellows operated piloted valve). Nevertheless, other inflow control devices and/or piloted valves may be used and remain within the scope of the disclosure. The inflow control device 230 may include a production fluid inlet 235 operable to receive the production fluid 210 (e.g., from the annulus 205 and having the pressure (P3)), a control inlet 240 operable to receive control fluid having the higher control pressure ($P2^{++}$) or the lower control pressure ($P2^{+}$), and a production fluid outlet 245 operable to pass the production fluid 210 to the tubing 225. Accordingly, the inflow control device 230 is configured to close or open the production fluid outlet 245 based on the pressure values (P3, $P2^{++}$, P1) or (P3, $P2^{+}$, P1). The inflow control device 230 may additionally be configured to have a pressure drop (P3−P1) across the production fluid inlet 235 and the production fluid outlet 245.

Figure 3A:
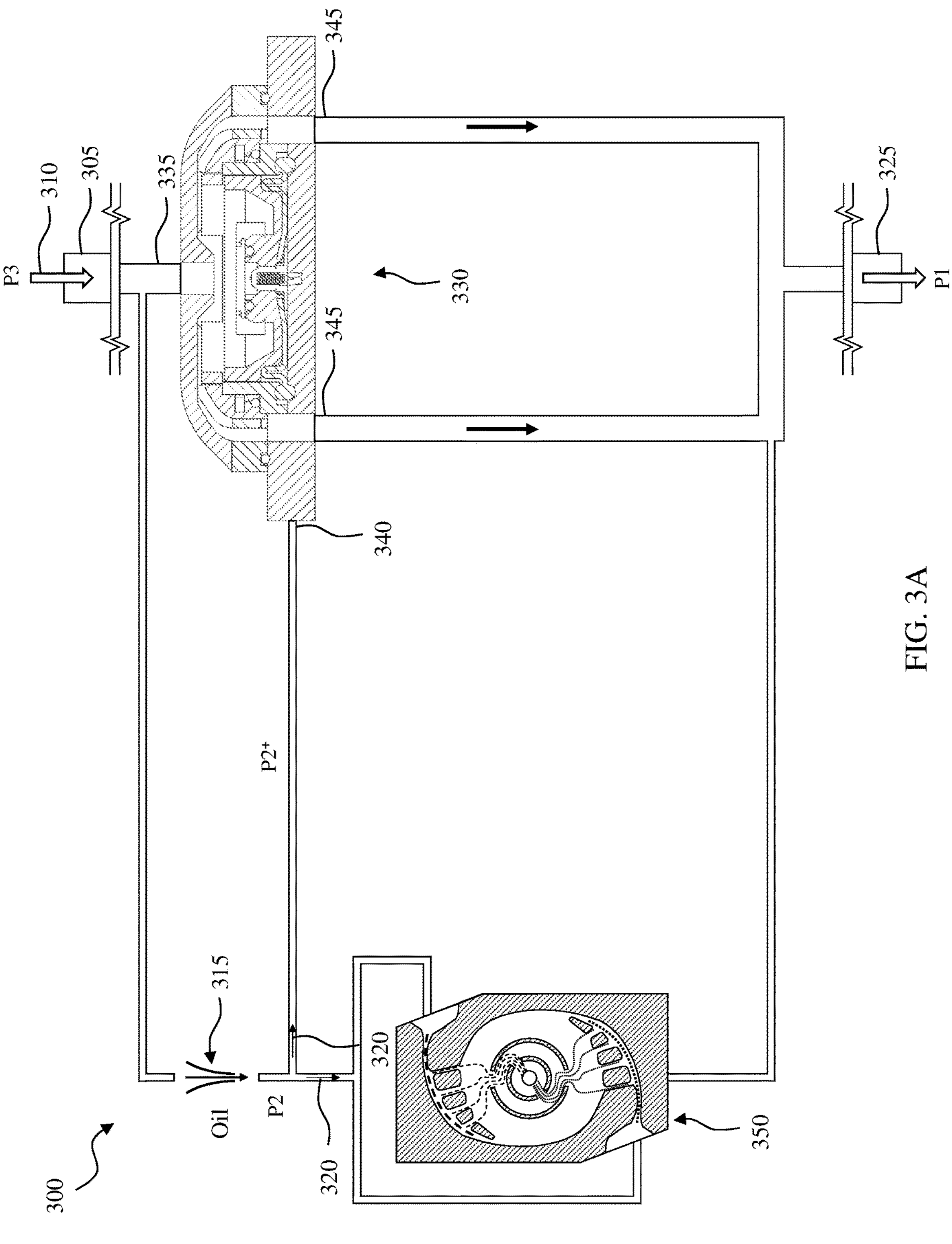
FIGS. 3A and 3B illustrate different views of a fluid flow control system designed, manufactured, and/or operated according to one or more alternative embodiments of the disclosure at different states of operation.
Figure 3B:
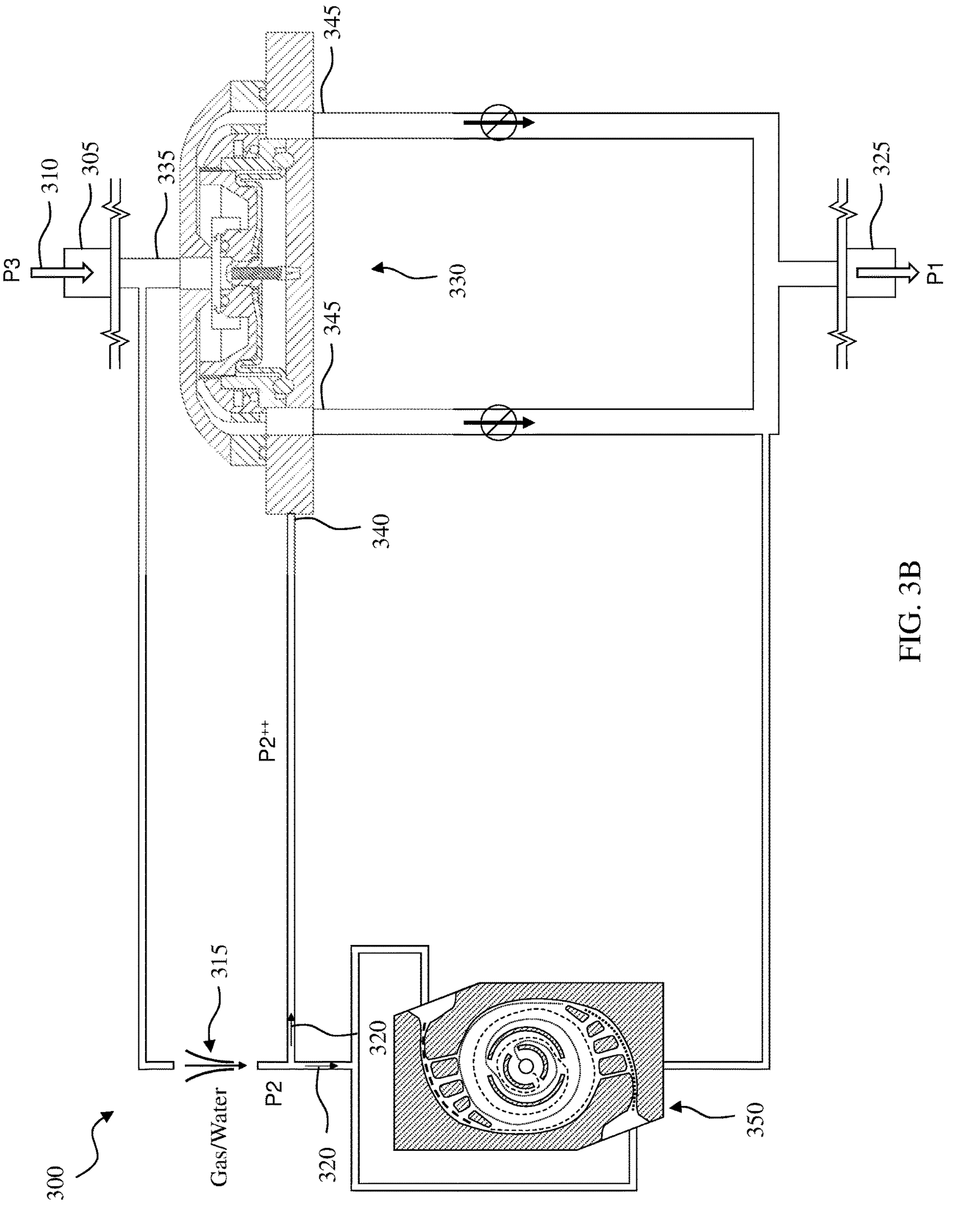

Turning to FIGS. 3A and 3B, illustrated are different views of a fluid flow control system 300 designed, manufactured, and/or operated according to one or more alternative embodiments of the disclosure at different states of operation. The fluid flow control system 300, similar to the fluid flow control system 200, includes a flow restrictor 315 operable to receive production fluid 310 (e.g . . . from an annulus 305) having a pressure (P3) and discharge control fluid 320 having a control pressure (P2). The fluid flow control system 300 of the embodiment of FIGS. 3A and 3B additionally includes a fluidic diode 350 placed between the flow restrictor 315 and a tubing 325 the fluid flow control system 300 is configured to couple to. In at least this embodiment, the fluidic diode 350 is configured to change the control pressure (P2) to a higher control pressure ($P2^{++}$) when the fluidic diode 350 encounters lower viscosity fluids and is configured to change the control pressure (P2) to a lower control pressure ($P2^{+}$) when the fluidic diode 350 encounters higher viscosity fluids. In the embodiment of FIGS. 3A and 3B, the fluidic diode 350 is a vortex fluidic diode, with for example internal structures such as vanes. In another embodiment, the fluidic diode is a Tesla valve, a diaphragm diode, a vortex diode without internal structures, or another suitable diode.

The fluid flow control system 300, in the illustrated embodiment, further includes an inflow control device 330 having a production fluid inlet 335 operable to receive the production fluid 310 having the pressure (P3), a control inlet 340 operable to receive control fluid 320 having the higher control pressure ($P2^{++}$) or the lower control pressure ($P2^{+}$), and a production fluid outlet 345 operable to pass the production fluid 310 having the pressure (P1) to tubing 325 it is configured to couple to, the inflow control device 330 configured to close or open the production fluid outlet 345 based upon pressure values (P3, $P2^{++}$, P1) or (P3, $P2^{+}$, P1). In the embodiment of FIGS. 3A and 3B, the inflow control device 330 is a piloted valve, and more specifically a diaphragm controlled piloted valve.

With the foregoing in mind, those skilled in the art understand that the flow restrictor 315 and the fluidic diode 350 may be specifically tailored to provide a different higher control pressure ($P2^{++}$) and a different lower control pressure ($P2^{+}$) based upon a desired water cutoff value. Thus, in essence the flow restrictor 315 and the fluidic diode 350 may be sized to provide a requisite higher control pressure ($P2^{++}$) and a lower control pressure ($P2^{+}$) to the inflow control device 330 (e.g., diaphragm or bellows of a piloted valve).

With initial reference to FIG. 3A, illustrated is a situation wherein the fluid flow control system 300 is encountering higher viscosity fluids (e.g., oil). As shown, the control pressure (P2) is only changed to the lower control pressure ($P2^{+}$), which is insufficient to close the inflow control device 330. Accordingly, the inflow control device 330 continues to provide the production fluid 310 through the inflow control device 330 to the tubing 325. Turning to FIG. 3B, illustrated is a situation wherein the fluid flow control system 300 is encountering lower viscosity fluids (e.g., gas, water, etc.). As shown, the control pressure (P2) is changed to the higher control pressure ($P2^{++}$), which is sufficient to close the inflow control device 330. Accordingly, the inflow control device 330 stops providing the production fluid 310 through the inflow control device 330 to the tubing 325.

Figure 4A:
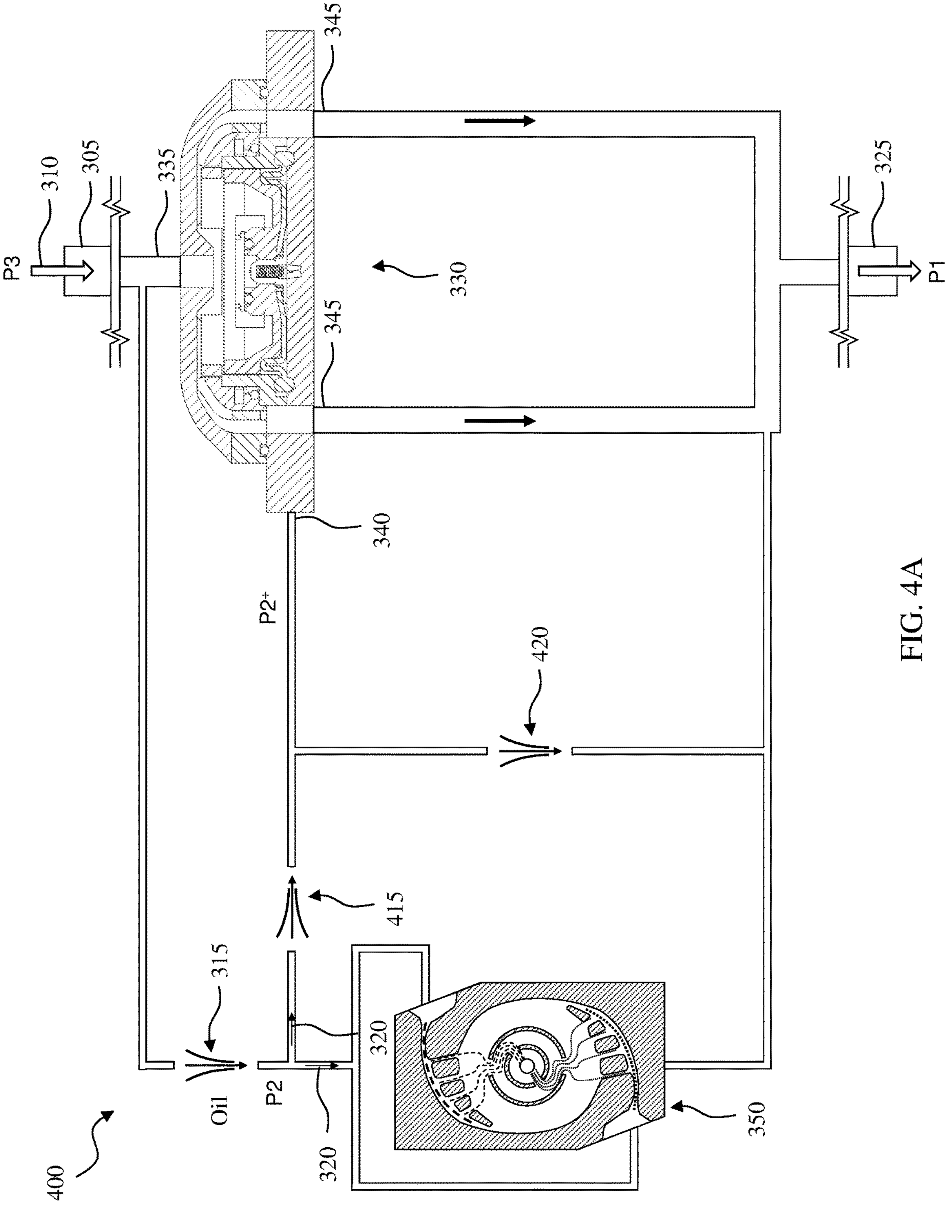
FIGS. 4A and 4B illustrate different views of a fluid flow control system designed, manufactured, and/or operated according to one or more alternative embodiments of the disclosure at different states of operation.
Figure 4B:
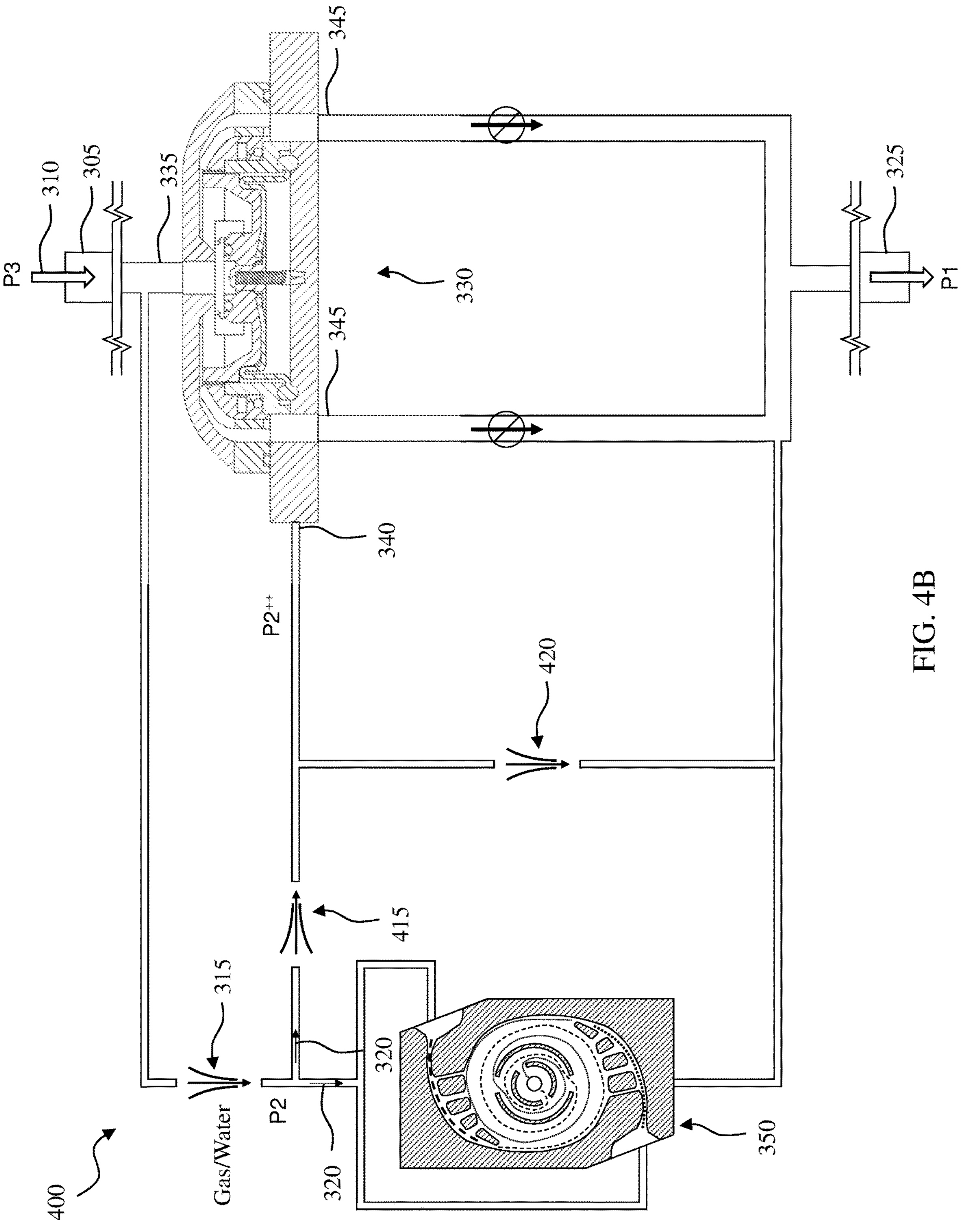

Turning now to FIGS. 4A and 4B illustrated is a fluid flow control system 400 designed, manufactured and/or operated according to one or more alternative embodiments of the disclosure at different states of operation. The fluid flow control system 400 is similar in many respects to the fluid flow control system 300 of FIGS. 3A and 3B. Accordingly, like reference numbers have been used to indicated similar, if not identical, features. The fluid flow control system 400 differs from the fluid flow control system 300 in that the fluid flow control system 400 further includes a second flow restrictor 415 placed in series with the first flow restrictor 315, and a third flow restrictor 420 placed in series with the first flow restrictor 315, the second and third flow restrictors 415, 420 placed in parallel with the fluidic diode 350. In one or more embodiments, the second flow restrictor 415 and the third flow restrictor 420 may be used to further tailor the higher control pressure ($P2^{++}$) and the different lower control pressure ($P2^{+}$). In at least one embodiment, the second flow restrictor 415 and the third flow restrictor 420 are the same type and size of flow restrictors. In yet another embodiment, the second flow restrictor 415 and the third flow restrictor 420 are different sizes and/or different types of flow restrictors.

Figure 5A:
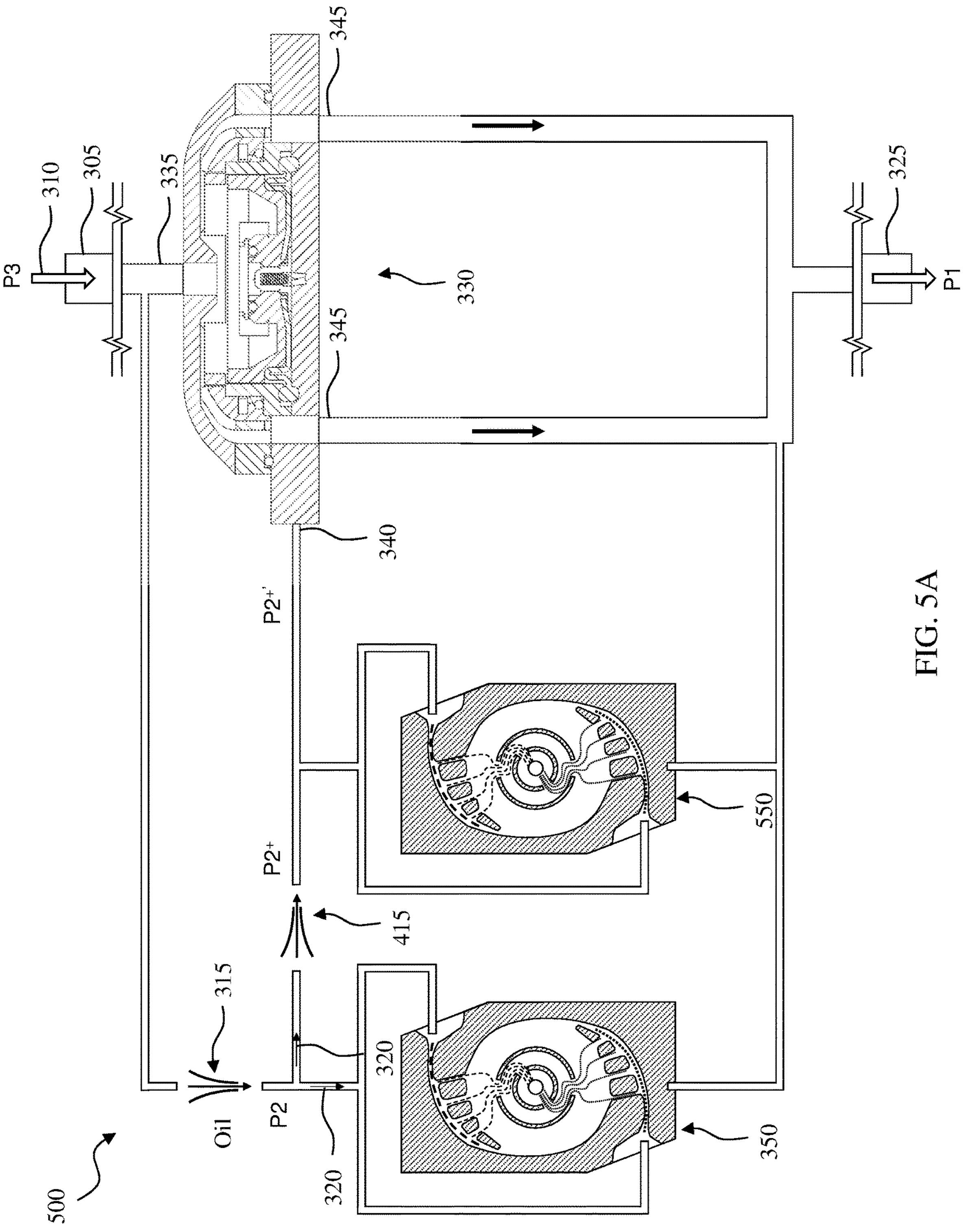
FIGS. 5A and 5B illustrate different views of a fluid flow control system designed, manufactured, and/or operated according to one or more alternative embodiments of the disclosure at different states of operation.
Figure 5B:
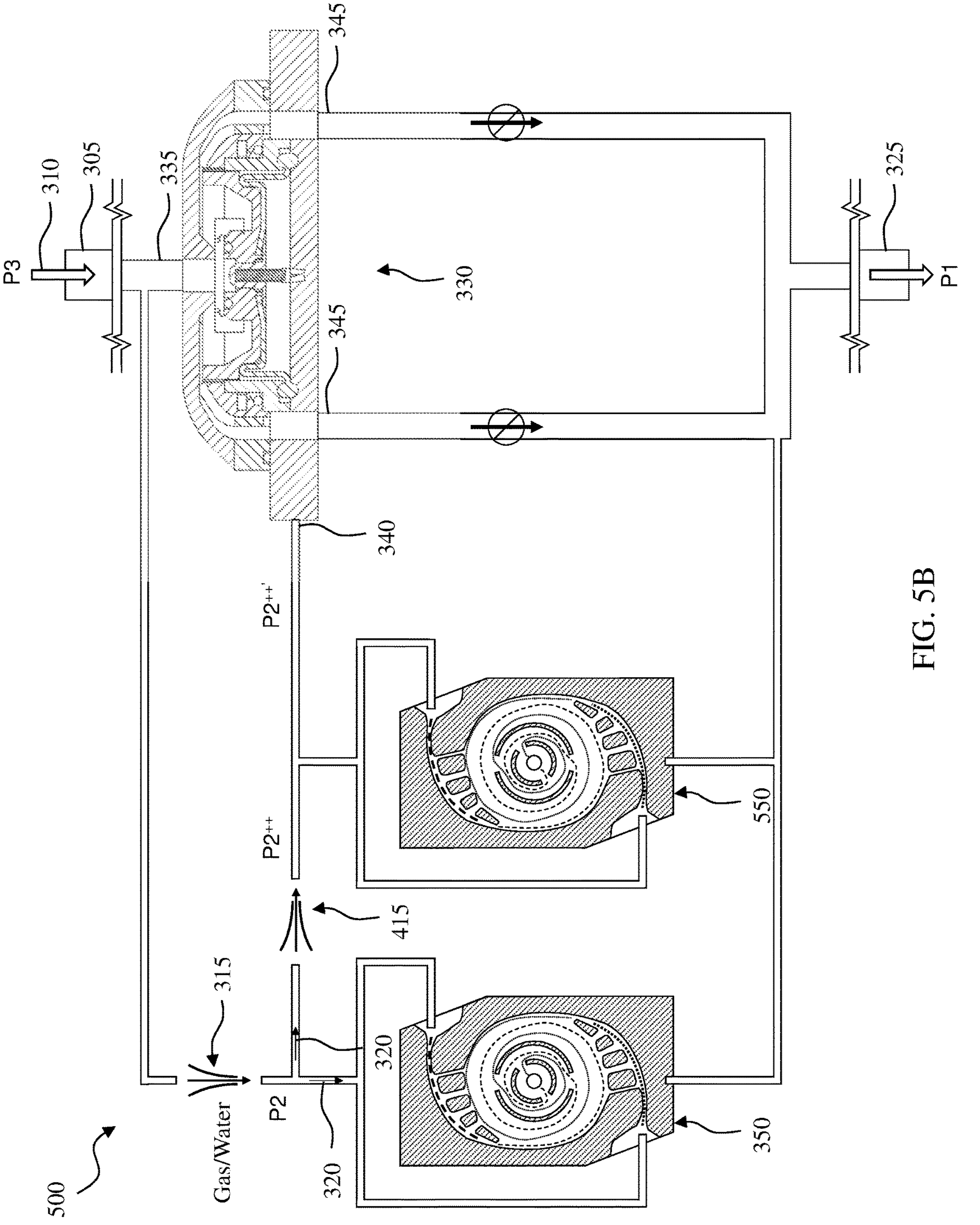

Turning now to FIGS. 5A and 5B illustrated is a fluid flow control system 500 designed, manufactured and/or operated according to one or more alternative embodiments of the disclosure at different states of operation. The fluid flow control system 500 is similar in many respects to the fluid flow control system 400 of FIGS. 4A and 4B. Accordingly, like reference numbers have been used to indicated similar, if not identical, features. The fluid flow control system 500 differs from the fluid flow control system 400 in that the fluid flow control system 500 does not include a third flow restrictor 420 placed in parallel with the fluidic diode 350, but includes a second fluidic diode 550 placed in parallel with the fluidic diode 350. In at least one embodiment, the second fluidic diode 550 is configured to change the higher control pressure ($P2^{++}$) to a significantly higher control pressure ($P2^{++'}$) when the second fluidic diode 550 encounters lower viscosity fluids, and is configured to change the control lower control pressure ($P2^{+}$) to a slightly higher lower control pressure ($P2^{+'}$) when the second fluidic diode 550 encounters higher viscosity fluids.

Figure 6A:
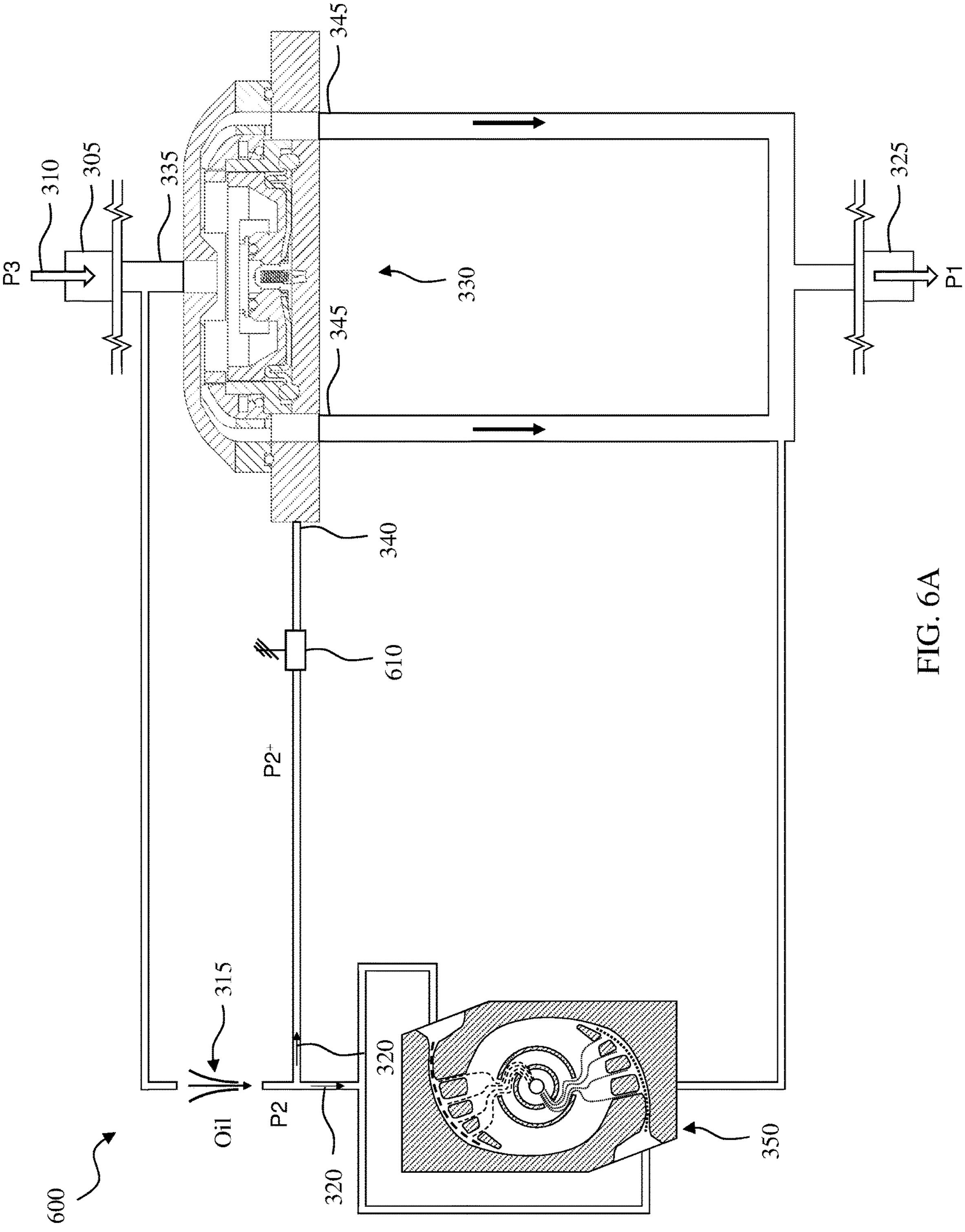
FIGS. 6A and 6B illustrate different views of a fluid flow control system designed, manufactured, and/or operated according to one or more alternative embodiments of the disclosure at different states of operation.
Figure 6B:
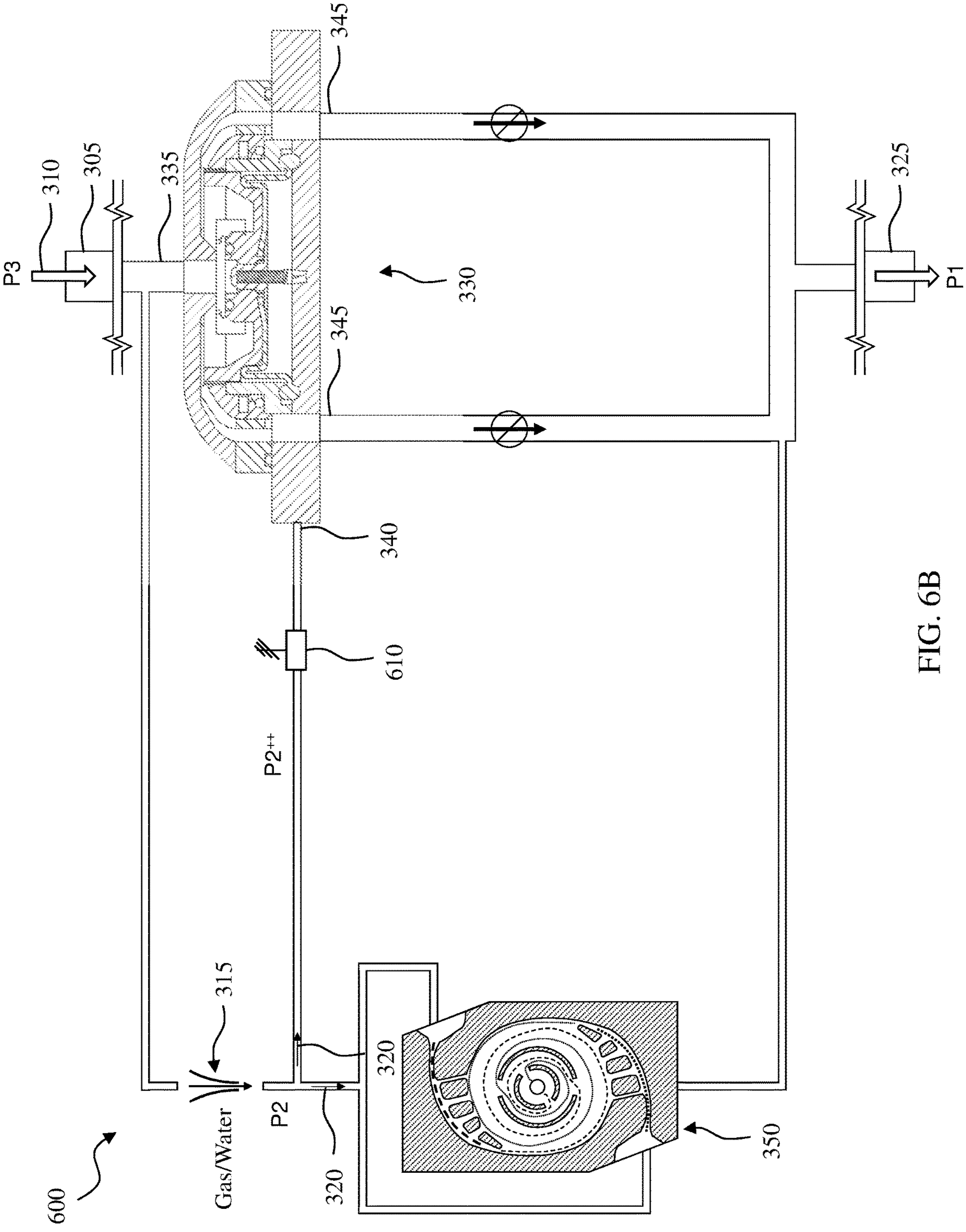

Turning now to FIGS. 6A and 6B illustrated is a fluid flow control system 600 designed, manufactured and/or operated according to one or more alternative embodiments of the disclosure at different states of operation. The fluid flow control system 600 is similar in many respects to the fluid flow control system 300 of FIGS. 3A and 3B. Accordingly, like reference numbers have been used to indicated similar, if not identical, features. The fluid flow control system 600 differs from the fluid flow control system 300 in that the fluid flow control system 600 further includes a pressure relief valve 610 positioned between the flow restrictor 315 and the control inlet 340. In one or more embodiments, the pressure relief valve 610 is configured to eliminate a range of pressures between the higher control pressure ($P2^{++}$) and the lower control pressure ($P2^{+}$) that would only partially close the inflow control device 330. In at least one embodiment, this small pressure range could cause the inflow control device 330 to chatter, which could damage the valve, and the pressure relief valve 610 would eliminate such. It should be noted that the pressure relief valve 610 of FIGS. 6A and 6B may be used in various different configurations of a fluid flow control system, including the fluid flow control systems 400, 500 of FIGS. 4A through 5B, among others.

Figure 7A:
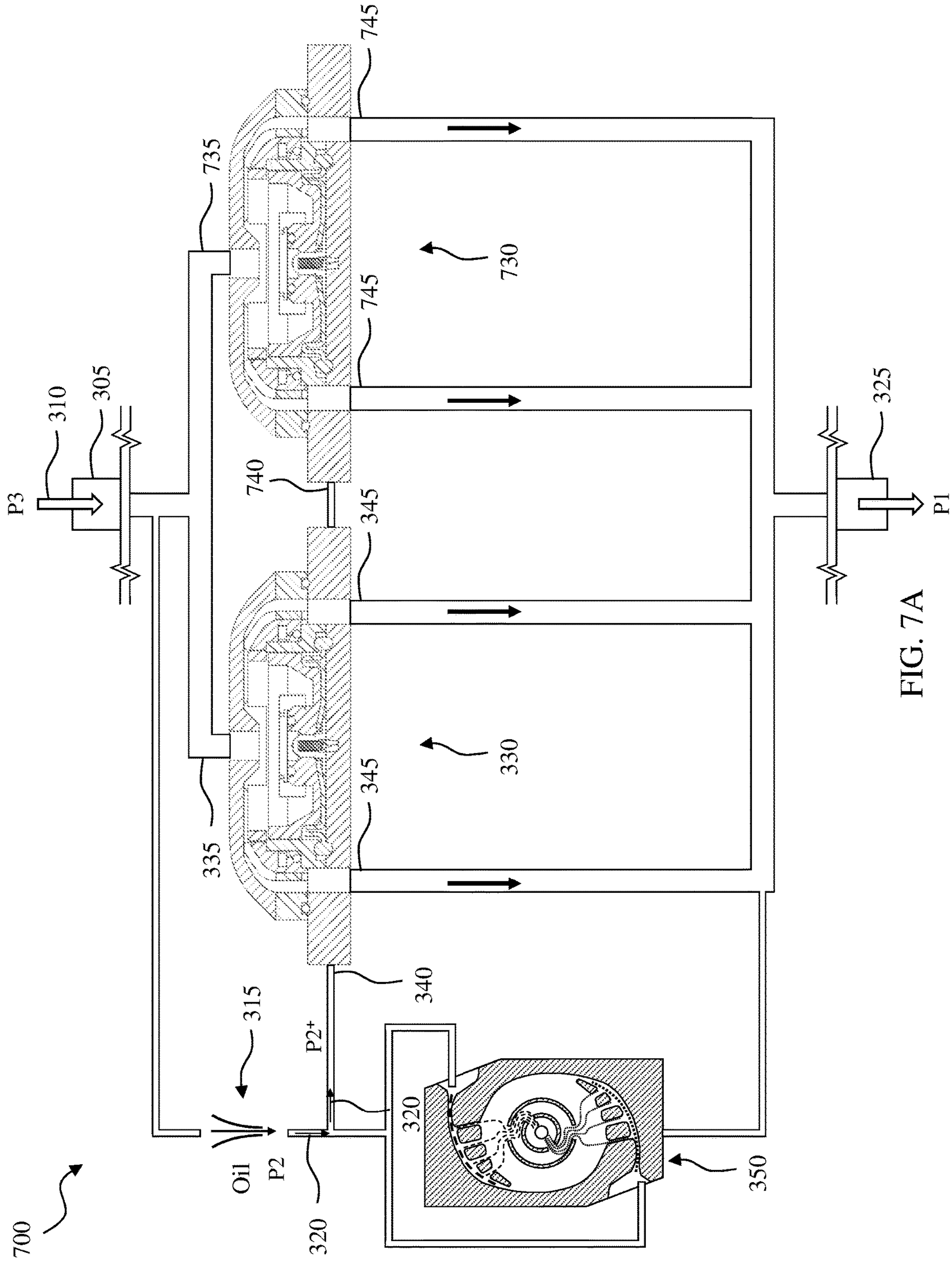
FIGS. 7A and 7B illustrate different views of a fluid flow control system designed, manufactured, and/or operated according to one or more alternative embodiments of the disclosure at different states of operation.
Figure 7B:
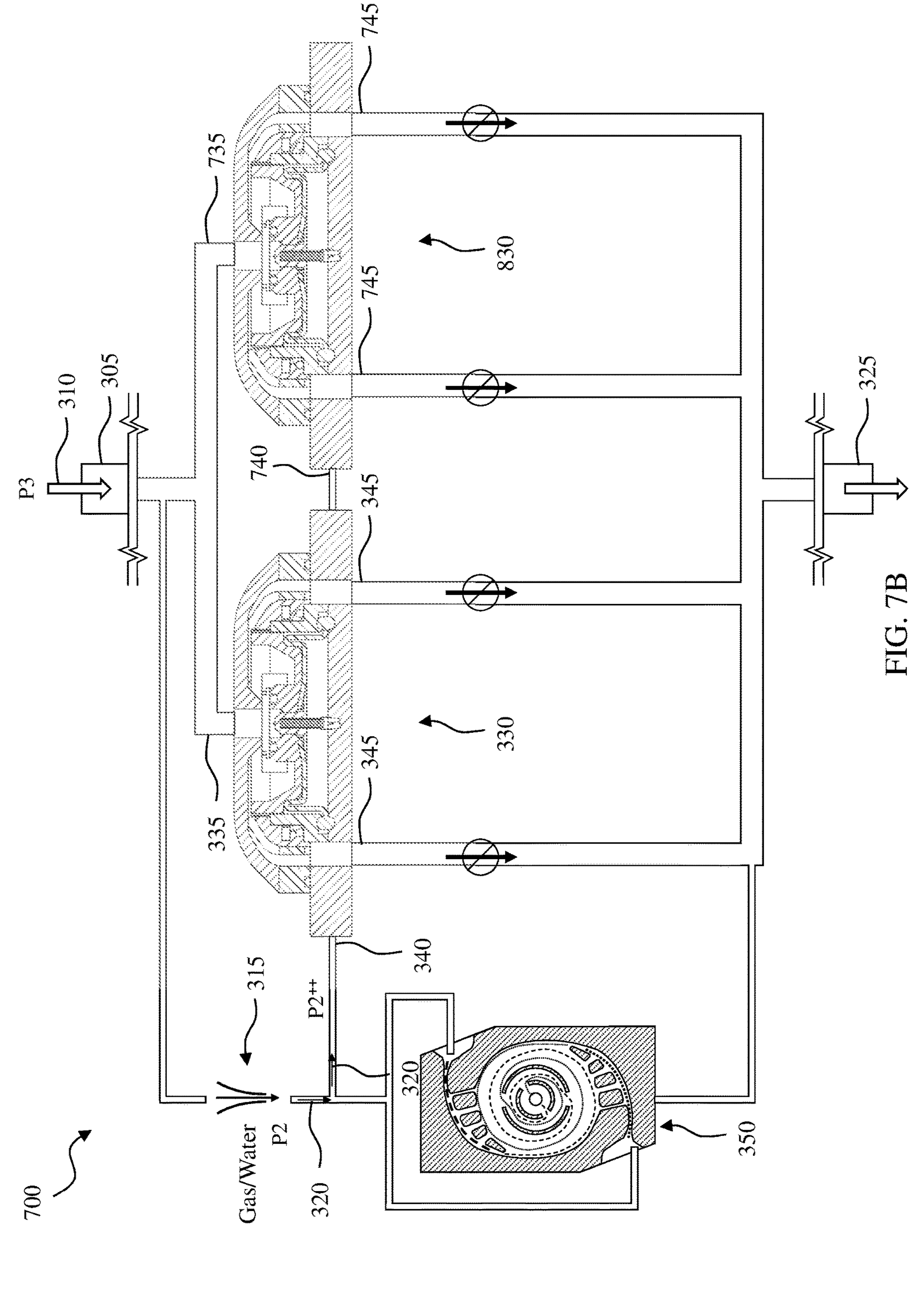

Turning now to FIGS. 7A and 7B illustrated is a fluid flow control system 700 designed, manufactured and/or operated according to one or more alternative embodiments of the disclosure at different states of operation. The fluid flow control system 700 is similar in many respects to the fluid flow control system 300 of FIGS. 3A and 3B. Accordingly, like reference numbers have been used to indicated similar, if not identical, features. The fluid flow control system 700 differs from the fluid flow control system 300 in that the fluid flow control system 700 further includes a second inflow control device 730. In one or more embodiments, the second inflow control device 730 has a second production fluid inlet 735 operable to receive the production fluid 310 having the pressure (P3), a second control inlet 740 operable to receive the control fluid 320 having the higher control pressure ($P2^{++}$) or the lower control pressure ($P2^{+}$), and a second production fluid outlet 745 operable to pass the production fluid 310 having the pressure (P1) to the tubing 325 it is configured to couple to, the second inflow control device 730 configured to close or open the second production fluid outlet based upon pressure values (P3, $P2^{++}$, P1) or (P3, $P2^{+}$, P1).

In at least one embodiment, the second inflow control device 730 may be used to change the oil to water ratio entering the tubing 325. Furthermore, the first and second inflow control devices 330, 730 could be configured to open and close when encountering different fluid viscosities. For example, in at least one embodiment, both the first and second inflow control devices 330, 730 could be configured to be open for oil, both the first and second inflow control devices 330, 730 could be configured to be closed for gas, and one of the first or second inflow control devices 330, 730 configured to be open for a mixture of oil and gas and the other of the first or second inflow control devices 330, 730 configured to be closed for the mixture of oil and gas. Furthermore, while only two inflow control devices 330, 730 are illustrated in the embodiment of FIGS. 7A and 7B, other embodiments may be used wherein three or more inflow control devices are employed.

Figure 8:
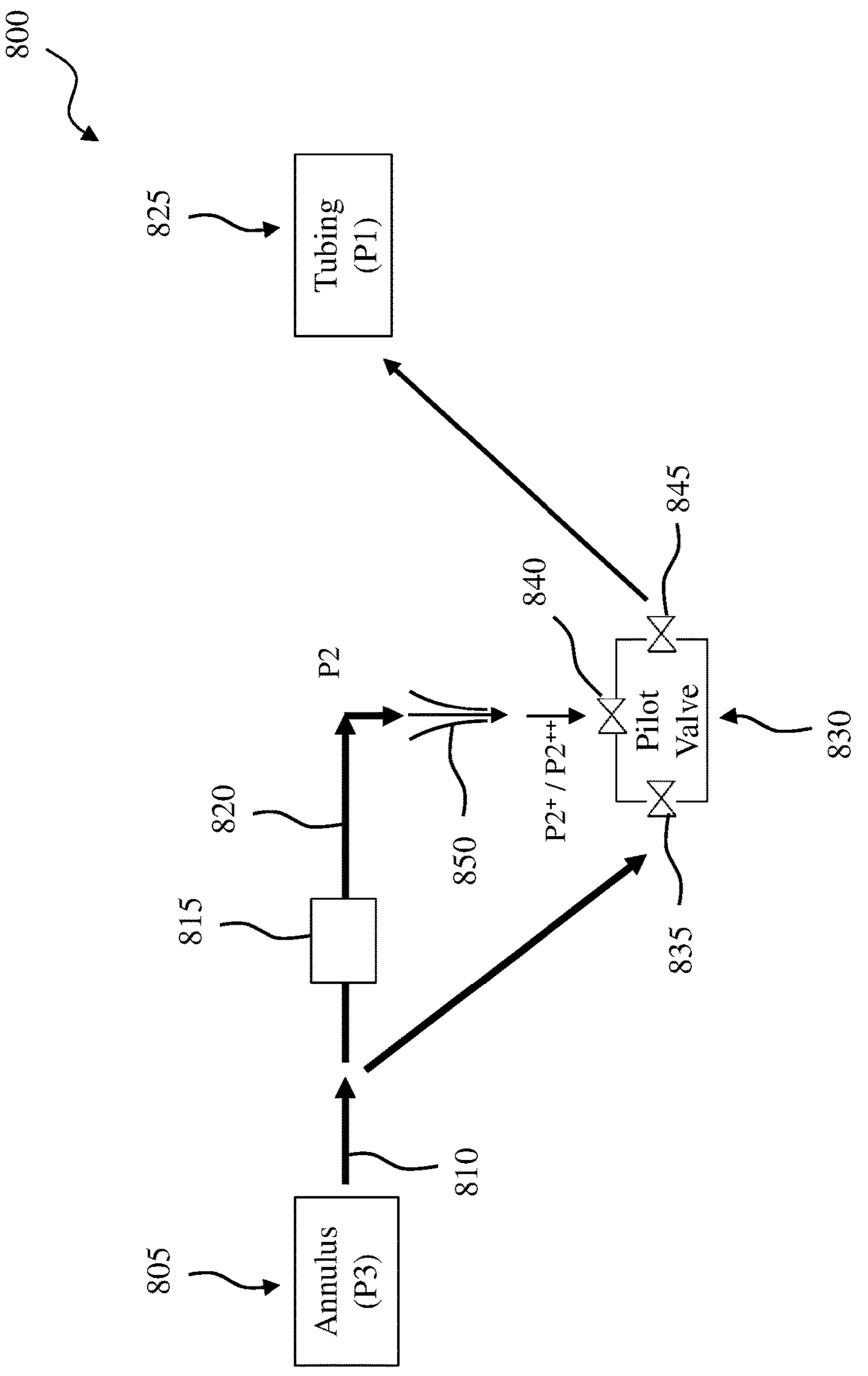
FIG. 8 illustrates a fluid flow control system designed, manufactured and/or operated according to one or more alternative embodiments of the disclosure.

FIG. 8 illustrates a fluid flow control system 800 designed, manufactured and/or operated according to one or more alternative embodiments of the disclosure. The fluid flow control system 800, in at least one embodiment, may include a fluidic diode 815 operable to receive production fluid 810 (e.g., from an annulus 805) having a pressure (P3), and discharge control fluid 820 having a control pressure (P2). The fluidic diode 815, in one embodiment, may be configured to easily pass higher viscosity fluids (e.g., oil, water, etc.), but reduces the flow of (e.g., chokes off) lower viscosity fluid (e.g., gas). Accordingly, the control pressure (P2) will vary based upon the type or constituents of fluid passing through the fluidic diode 815. The fluidic diode 815 may comprise any of the fluidic diodes discussed above.

The fluid flow control system 800, in one or more embodiments, may further include a flow restrictor 850 placed between the fluidic diode 815 and the tubing 825. The flow restrictor 850, in one other embodiment, may be configured to provide a lower pressure drop across its outlet with lower viscosity fluids (e.g., gas) and a higher pressure drop across its outlet with higher viscosity fluids (e.g., oil, water, etc.). Stated another way, the flow restrictor 850 is configured to provide a greater degree of restriction to higher viscosity fluids (e.g., oil, water, etc.) than lower viscosity fluids (e.g., gas). Accordingly, when the flow restrictor 850 encounters the higher viscosity fluids, the choking off effect changes a pressure that the control inlet 840 sees to a higher control pressure ($P2^{++}$). This higher control pressure ($P2^{++}$) may, in contrast to the control pressure (P2) (e.g., or the lower control pressure ($P2^{+}$)), be sufficient to close the inflow control device 830, and thus close the flow of fluid (e.g., oil, water, etc.) from the annulus 805 to the tubing 825. However, when the flow restrictor 850 encounters the lower viscosity fluids, the lack of choking off effect only changes a pressure that the control inlet 840 sees to a lower control pressure ($P2^{+}$). This lower control pressure ($P2^{+}$) may, in contrast to the higher control pressure ($P2^{++}$), be insufficient to close the inflow control device 830, and thus the flow of fluid (e.g., gas) from the annulus 805 to the tubing 825 remains open.

Thus, in one or more embodiments, the flow restrictor 850 is configured to change the control pressure (P2) to a higher control pressure ($P2^{++}$) when the flow restrictor 850 encounters higher viscosity fluids (e.g., oil, water, etc.) and is configured to change the control pressure (P2) to a lower control pressure ($P2^{+}$) when the flow restrictor 850 encounters lower viscosity fluids (e.g., gas). Accordingly, as the production fluid 810 changes in composition, and thus as a whole becomes less viscous or more viscous, the control pressure (P2) may be adjusted (e.g., automatically adjusted).

The fluid flow control system 800 may additionally include an inflow control device 830, which in some embodiments may be a pressure operated inflow control device. In at least one embodiment, the inflow control device 830 is a piloted valve (e.g., diaphragm or bellows operated piloted valve). Nevertheless, other inflow control devices and/or piloted valves may be used and remain within the scope of the disclosure. The inflow control device 830 may include a production fluid inlet 835 operable to receive the production fluid 810 (e.g., from the annulus 805 and having the pressure (P3)), a control inlet 840 operable to receive control fluid having the higher control pressure ($P2^{++}$) or the lower control pressure ($P2^{+}$), and a production fluid outlet 845 operable to pass the production fluid 810 to the tubing 825. Accordingly, the inflow control device 830 is configured to close or open the production fluid outlet 845 based on the pressure values (P3, $P2^{++}$, P1) or (P3, $P2^{+}$, P1).

Figure 9A:
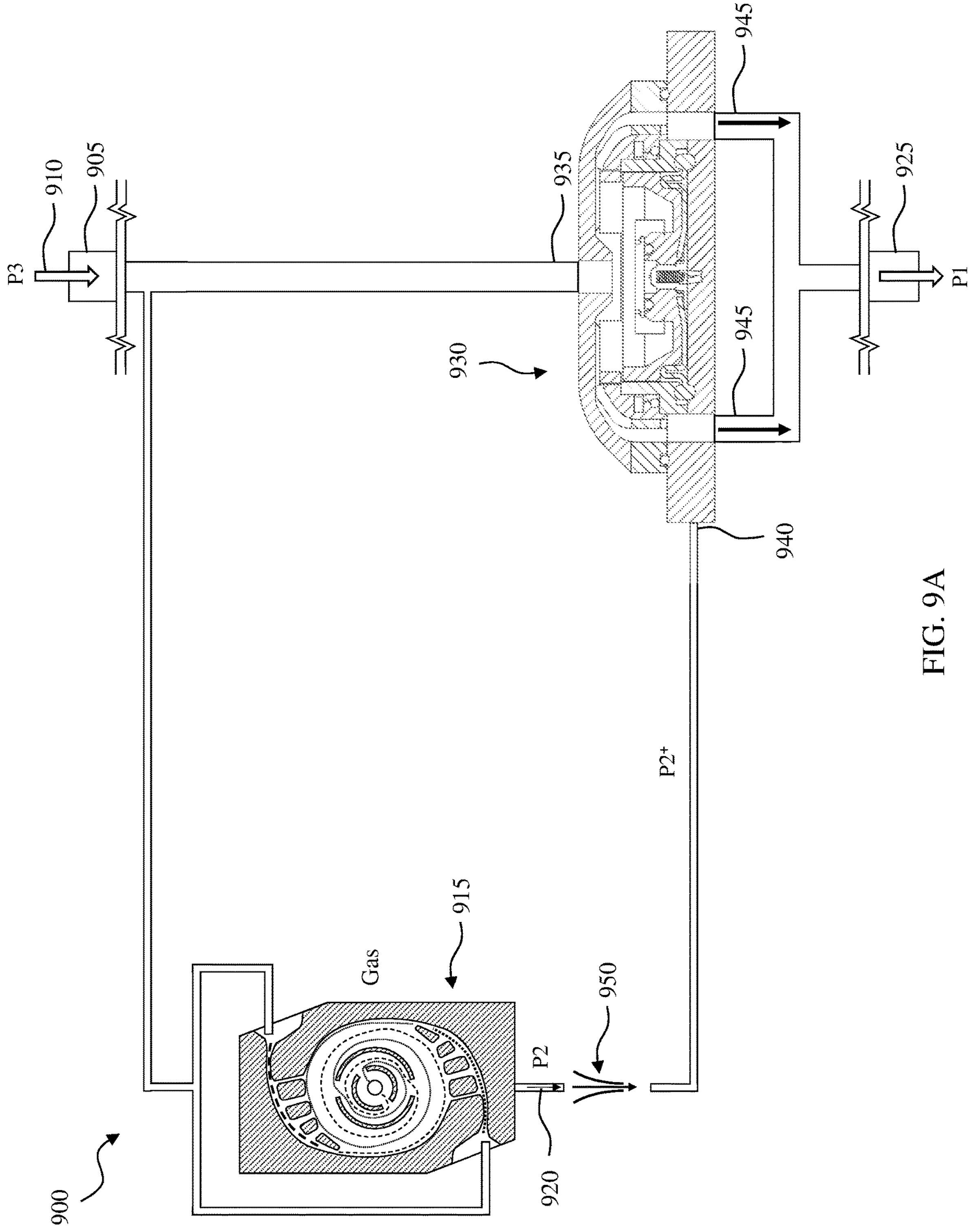
FIGS. 9A and 9B illustrate different views of a fluid flow control system designed, manufactured, and/or operated according to one or more alternative embodiments of the disclosure at different states of operation.
Figure 9B:
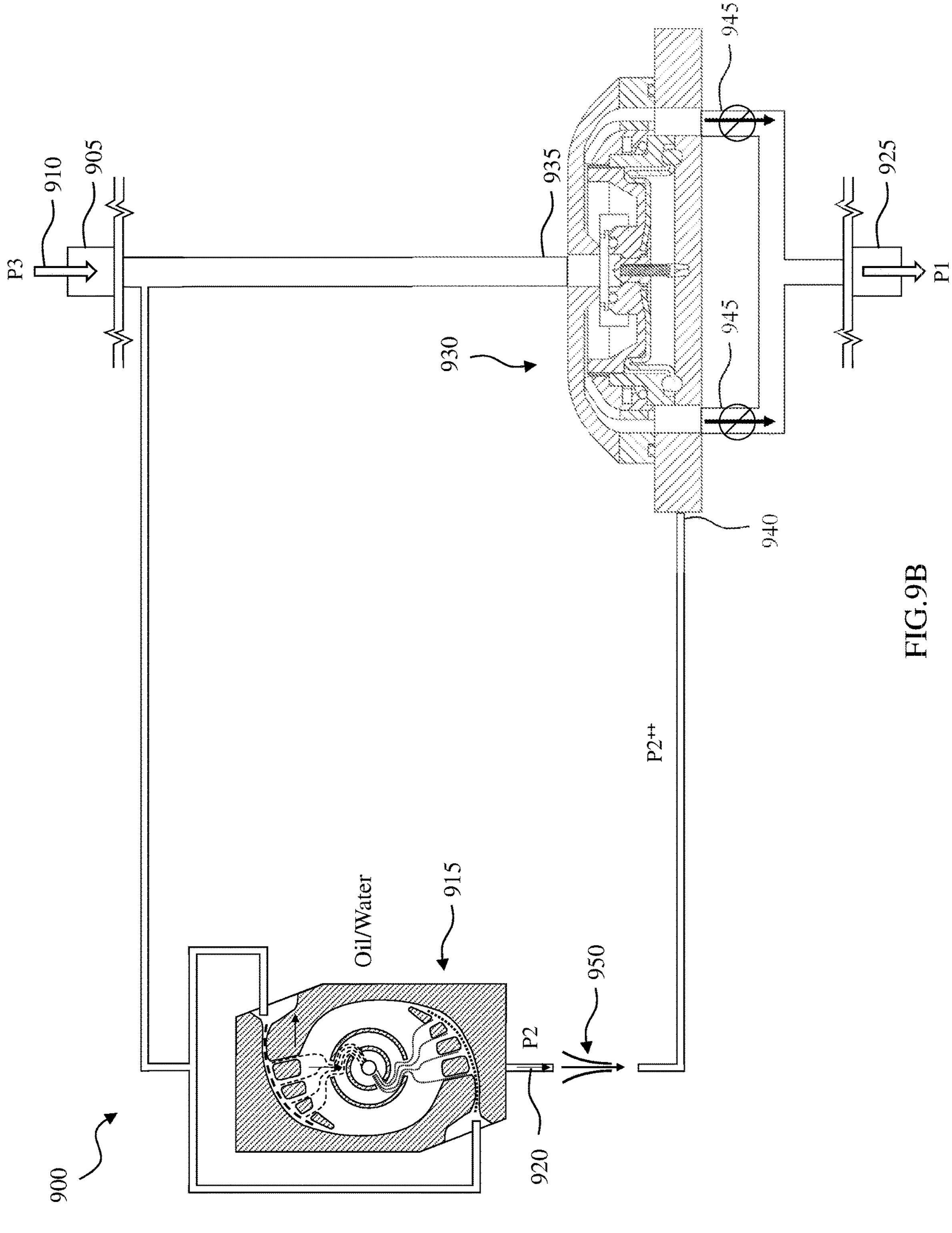

Turning to FIGS. 9A and 9B, illustrated are different views of a fluid flow control system 900 designed, manufactured, and/or operated according to one or more alternative embodiments of the disclosure at different states of operation. The fluid flow control system 900, similar to the fluid flow control system 800, includes a fluidic diode 915 operable to receive production fluid 910 having a pressure (P3) and discharge control fluid 920 having a control pressure (P2). The fluid flow control system 900 of the embodiment of FIGS. 9A and 9B additionally includes a flow restrictor 950 placed between the fluidic diode 915 and a tubing 925 the fluid flow control system 900 is configured to couple to. In at least this embodiment, the flow restrictor 950 is configured to change the control pressure (P2) to a higher control pressure ($P2^{++}$) when the flow restrictor 950 encounters higher viscosity fluids and is configured to change the control pressure (P2) to a lower control pressure ($P2^{+}$) when the flow restrictor 950 encounters lower viscosity fluids.

The fluid flow control system 900, in the illustrated embodiment, further includes an inflow control device 930 having a production fluid inlet 935 operable to receive the production fluid 910 having the pressure (P3), a control inlet 940 operable to receive control fluid 920 having the higher control pressure ($P2^{++}$) or the lower control pressure ($P2^{+}$), and a production fluid outlet 945 operable to pass the production fluid 910 having the pressure (P1) to tubing 925 it is configured to couple to, the inflow control device 930 configured to close or open the production fluid outlet 945 based upon pressure values (P3, $P2^{++}$, P1) or (P3, $P2^{+}$, P1). In the embodiment of FIGS. 9A and 9B, the inflow control device 930 is a piloted valve, and more specifically a diaphragm controlled piloted valve.

With the foregoing in mind, those skilled in the art understand that the fluidic diode 915 and the flow restrictor 950 may be specifically tailored to provide a different higher control pressure ($P2^{++}$) and a different lower control pressure ($P2^{+}$) based upon a desired fluid cutoff values. Thus, in essence the fluidic diode 915 and the flow restrictor 950 may be sized to provide a requisite higher control pressure ($P2^{++}$) and a lower control pressure ($P2^{+}$) to the inflow control device 930 (e.g., diaphragm or bellows of a piloted valve).

With initial reference to FIG. 9A, illustrated is a situation wherein the fluid flow control system 900 is encountering lower viscosity fluids (e.g., gas). As shown, the control pressure (P2) is only changed to the lower control pressure ($P2^{+}$), which is insufficient to close the inflow control device 930. Accordingly, the inflow control device 930 continues to provide the production fluid 910 through the inflow control device 930 to the tubing 925. Turning to FIG. 9B, illustrated is a situation wherein the fluid flow control system 900 is encountering higher viscosity fluids (e.g., oil, water, etc.). As shown, the control pressure (P2) is changed to the higher control pressure ($P2^{++}$), which is sufficient to close the inflow control device 930. Accordingly, the inflow control device 930 stops providing the production fluid 910 through the inflow control device 930 to the tubing 925.

Aspects disclosed herein include:

A. A fluid flow control system, the fluid flow system including: 1) a flow restrictor operable to receive production fluid having a pressure (P3) and discharge control fluid having a control pressure (P2); 2) a fluidic diode placed between the flow restrictor and a tubing the fluid flow control system is configured to couple to, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids; and 3) an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1).

B. A well system, the well system including: 1) a wellbore extending through one or more subterranean formations; 2) tubing positioned within the wellbore; and 3) a fluid flow control system positioned between the wellbore and the tubing, the fluid flow control system including: a) a flow restrictor operable to receive production fluid having a pressure (P3) and discharge control fluid having a control pressure (P2); b) a fluidic diode placed between the flow restrictor and the tubing, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids; and c) an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to the tubing, the inflow control device configured to close or open the production fluid outlet based upon pressure values (P3, $P2^{++}$, P1) or (P3, $P2^{+}$, P1).

C. A method, the method including: 1) positioning a fluid flow control system within a wellbore extending through one or more subterranean formations, the fluid flow control system located between the wellbore and tubing positioned in the wellbore, the fluid flow control system including: a) a flow restrictor operable to receive production fluid having a pressure (P3) and discharge control fluid having a control pressure (P2); b) a fluidic diode placed between the flow restrictor and the tubing, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids; and c) an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to the tubing, the inflow control device configured to close or open the production fluid outlet based upon pressure values (P3, $P2^{++}$, P1) or (P3, $P2^{+}$, P1); and 2) producing fluid from the wellbore into the tubing, the lower viscosity fluids closing the inflow control device and the higher viscosity fluids opening the inflow control device.

D. A fluid flow control system, the fluid flow control system including: 1) a fluidic diode operable to receive production fluid having a pressure (P3) and discharge control fluid having a control pressure (P2); 2) a flow restrictor placed between the fluidic diode and a tubing the fluid flow control system is configured to couple to, wherein the flow restrictor is configured to change the control pressure (P2) to a higher control pressure ($P2^{++}$) when the flow restrictor encounters higher viscosity fluids and is configured to change the control pressure (P2) to a lower control pressure ($P2^{+}$) when the flow restrictor encounters lower viscosity fluids; and 3) an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1).

E. A well system, the well system including: 1) a wellbore extending through one or more subterranean formations; 2) tubing positioned within the wellbore; and 3) a fluid flow control system positioned between the wellbore and the tubing, the fluid flow control system including: a) a fluidic diode operable to receive production fluid having a pressure (P3) and discharge control fluid having a control pressure (P2); b) a flow restrictor placed between the fluidic diode and a tubing the fluid flow control system is configured to couple to, wherein the flow restrictor is configured to change the control pressure (P2) to a higher control pressure ($P2^{++}$) when the flow restrictor encounters higher viscosity fluids and is configured to change the control pressure (P2) to a lower control pressure ($P2^{+}$) when the flow restrictor encounters lower viscosity fluids; and c) an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1).

F. A method, the method including: 1) positioning a fluid flow control system within a wellbore extending through one or more subterranean formations, the fluid flow control system located between the wellbore and tubing positioned in the wellbore, the fluid flow control system including: a) a fluidic diode operable to receive production fluid having a pressure (P3) and discharge control fluid having a control pressure (P2); b) a flow restrictor placed between the fluidic diode and a tubing the fluid flow control system is configured to couple to, wherein the flow restrictor is configured to change the control pressure (P2) to a higher control pressure ($P2^{++}$) when the flow restrictor encounters higher viscosity fluids and is configured to change the control pressure (P2) to a lower control pressure ($P2^{+}$) when the flow restrictor encounters lower viscosity fluids; c) an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1); and 2) producing fluid from the wellbore into the tubing, the lower viscosity fluids opening the inflow control device and the higher viscosity fluids closing the inflow control device.

Aspects A, B, C, D, E and F may have one or more of the following additional elements in combination: Element 1: wherein the fluidic diode is a vortex fluidic diode. Element 2: wherein the fluidic diode is a vortex fluidic diode including vanes. Element 3: wherein the fluidic diode is a vortex fluidic diode without vanes. Element 4: wherein the fluidic diode is a Tesla valve or a diaphragm diode. Element 5: wherein the flow restrictor is a fluid nozzle. Element 6: wherein the flow restrictor is a first flow restrictor, and further including second and third flow restrictors placed in series with the first flow restrictor and in parallel with the fluidic diode. Element 7: wherein the flow restrictor is a first flow restrictor and the fluidic diode is a first fluidic diode, and further including a second flow restrictor and a second fluidic diode placed in series with the first flow restrictor and in parallel with the first fluidic diode. Element 8: wherein the flow restrictor and fluidic diode are placed such that production fluid encounters the flow restrictor prior to the fluidic diode. Element 9: wherein the fluidic diode and flow restrictor are placed such that production fluid encounters the fluidic diode prior to the flow restrictor. Element 10: wherein the fluidic diode includes no moving parts. Element 11: wherein the inflow control device is a first inflow control device, and further including a second inflow control device, the second inflow control device having a second production fluid inlet operable to receive the production fluid having the pressure (P3), a second control inlet operable to receive the control fluid having the higher control pressure ($P2^{++}$) or the lower control pressure ($P2^{+}$), and a second production fluid outlet operable to pass the production fluid having the pressure (P1) to the tubing it is configured to couple to, the second inflow control device configured to close or open the second production fluid outlet based upon pressure values (P3, $P2^{++}$, P1) or (P3, $P2^{+}$, P1). Element 12: wherein the inflow control device is a first inflow control device, and further including a second inflow control device, the second inflow control device having a second production fluid inlet operable to receive the production fluid having the pressure (P3), a second control inlet operable to receive the control fluid having the higher control pressure ($P2^{++}$) or the lower control pressure ($P2^{+}$), and a second production fluid outlet operable to pass the production fluid having the pressure (P1) to the tubing it is configured to couple to, the second inflow control device configured to close or open the second production fluid outlet based upon pressure values (P3, $P2^{++}$, P1) or (P3, $P2^{+}$, P1). Element 13: further including a pressure relief valve positioned between the flow restrictor and the control inlet, the pressure relief valve configured to eliminate a range of pressures between the higher control pressure ($P2^{++}$) or the lower control pressure ($P2^{+}$) that would only partially close the inflow control device. Element 14: wherein the inflow control device is a piloted valve.

Those skilled in the art to which this application relates will appreciate that other and further additions, deletions, substitutions and modifications may be made to the described embodiments.

What is claimed is:

1. A fluid flow control system, comprising:

a flow restrictor operable to receive production fluid having a pressure (P3) and discharge control fluid having a control pressure (P2);

a fluidic diode placed between the flow restrictor and a tubing the fluid flow control system is configured to couple to, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids;

an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1); and a pressure relief valve positioned between the flow restrictor and the control inlet, the pressure relief valve configured to eliminate a range of pressures between the higher control pressure ($P2^{++}$) or the lower control pressure ($P2^{+}$) that would only partially close the inflow control device.

2. The fluid flow control system as recited in claim 1, wherein the fluidic diode is a vortex fluidic diode.

3. The fluid flow control system as recited in claim 1, wherein the flow restrictor is a fluid nozzle.

4. The fluid flow control system as recited in claim 1, wherein the flow restrictor is a first flow restrictor, and further including second and third flow restrictors placed in series with the first flow restrictor and in parallel with the fluidic diode.

5. The fluid flow control system as recited in claim 1, wherein the flow restrictor is a first flow restrictor and the fluidic diode is a first fluidic diode, and further including a second flow restrictor and a second fluidic diode placed in series with the first flow restrictor and in parallel with the first fluidic diode.

6. The fluid flow control system as recited in claim 1, wherein the flow restrictor and fluidic diode are placed such that production fluid encounters the flow restrictor prior to the fluidic diode.

7. The fluid flow control system as recited in claim 1, wherein the fluidic diode includes no moving parts.

8. The fluid flow control system as recited in claim 1, wherein the inflow control device is a first inflow control device, and further including a second inflow control device, the second inflow control device having a second production fluid inlet operable to receive the production fluid having the pressure (P3), a second control inlet operable to receive the control fluid having the higher control pressure ($P2^{++}$) or the lower control pressure ($P2^{+}$), and a second production fluid outlet operable to pass the production fluid having the pressure (P1) to the tubing it is configured to couple to, the second inflow control device configured to close or open the second production fluid outlet based upon pressure values (P3, $P2^{++}$, P1) or (P3, $P2^{+}$, P1).

9. The fluid flow control system as recited in claim 1, wherein the inflow control device is a piloted valve.

10. A well system, comprising:

a wellbore extending through one or more subterranean formations;

tubing positioned within the wellbore; and a fluid flow control system positioned between the wellbore and the tubing, the fluid flow control system including:

a flow restrictor operable to receive production fluid having a pressure (P3) and discharge control fluid having a control pressure (P2);

a fluidic diode placed between the flow restrictor and the tubing, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids;

an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to the tubing, the inflow control device configured to close or open the production fluid outlet based upon pressure values (P3, $P2^{++}$, P1) or (P3, $P2^{+}$, P1); and a pressure relief valve positioned between the flow restrictor and the control inlet, the pressure relief valve configured to eliminate a range of pressures between the higher control pressure ($P2^{++}$) or the lower control pressure ($P2^{+}$) that would only partially close the inflow control device.

11. The well system as recited in claim 10, wherein the fluidic diode is a vortex fluidic diode.

12. The well system as recited in claim 10, wherein the flow restrictor is a fluid nozzle.

13. The well system as recited in claim 10, wherein the flow restrictor is a first flow restrictor, and further including second and third flow restrictors placed in series with the first flow restrictor and in parallel with the fluidic diode.

14. The well system as recited in claim 10, wherein the flow restrictor is a first flow restrictor and the fluidic diode is a first fluidic diode, and further including a second flow restrictor and a second fluidic diode placed in series with the first flow restrictor and in parallel with the first fluidic diode.

15. The well system as recited in claim 10, wherein the flow restrictor and fluidic diode are placed such that production fluid encounters the flow restrictor prior to the fluidic diode.

16. The well system as recited in claim 10, wherein the fluidic diode includes no moving parts.

17. The well system as recited in claim 10, wherein the inflow control device is a first inflow control device, and further including a second inflow control device, the second inflow control device having a second production fluid inlet operable to receive the production fluid having the pressure (P3), a second control inlet operable to receive the control fluid having the higher control pressure ($P2^{++}$) or the lower control pressure ($P2^{+}$), and a second production fluid outlet operable to pass the production fluid having the pressure (P1) to the tubing it is configured to couple to, the second inflow control device configured to close or open the second production fluid outlet based upon pressure values (P3, $P2^{++}$, P1) or (P3, $P2^{+}$, P1).

18. The well system as recited in claim 10, wherein the inflow control device is a piloted valve.

19. A method, comprising:

positioning a fluid flow control system within a wellbore extending through one or more subterranean formations, the fluid flow control system located between the wellbore and tubing positioned in the wellbore, the fluid flow control system including:

a flow restrictor operable to receive production fluid having a pressure (P3) and discharge control fluid having a control pressure (P2);

a fluidic diode placed between the flow restrictor and the tubing, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids; and an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to the tubing, the inflow control device configured to close or open the production fluid outlet based upon pressure values (P3, $P2^{++}$, P1) or (P3, $P2^{+}$, P1); and a pressure relief valve positioned between the flow restrictor and the control inlet, the pressure relief valve configured to eliminate a range of pressures between the higher control pressure ($P2^{++}$) or the lower control pressure ($P2^{+}$) that would only partially close the inflow control device; and producing fluid from the wellbore into the tubing, the lower viscosity fluids closing the inflow control device and the higher viscosity fluids opening the inflow control device.

20. A fluid flow control system, comprising:

a flow restrictor operable to receive production fluid having a pressure (P3) and discharge control fluid having a control pressure (P2);

a fluidic diode placed between the flow restrictor and a tubing the fluid flow control system is configured to couple to, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids;

an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to tubing it is configured to couple to, the inflow control device configured to close or open the production fluid outlet based upon pressure values (P3, $P2^{++}$, P1) or (P3, $P2^{+}$, P1), wherein the flow restrictor is a first flow restrictor, and further including second and third flow restrictors placed in series with the first flow restrictor and in parallel with the fluidic diode.

21. A well system, comprising:

a wellbore extending through one or more subterranean formations;

tubing positioned within the wellbore; and a fluid flow control system positioned between the wellbore and the tubing, the fluid flow control system including:

a flow restrictor operable to receive production fluid having a pressure (P3) and discharge control fluid having a control pressure (P2);

a fluidic diode placed between the flow restrictor and the tubing, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids;

an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to the tubing, the inflow control device configured to close or open the production fluid outlet based upon pressure values (P3, $P2^{++}$, P1) or (P3, $P2^{+}$, P1), wherein the flow restrictor is a first flow restrictor, and further including second and third flow restrictors placed in series with the first flow restrictor and in parallel with the fluidic diode.

22. A method, comprising:

positioning a fluid flow control system within a wellbore extending through one or more subterranean formations, the fluid flow control system located between the wellbore and tubing positioned in the wellbore, the fluid flow control system including:

a flow restrictor operable to receive production fluid having a pressure (P3) and discharge control fluid having a control pressure (P2);

a fluidic diode placed between the flow restrictor and the tubing, wherein the fluidic diode is configured to change the control pressure (P2) to a higher control pressure ($P2^{++}$) when the fluidic diode encounters lower viscosity fluids and is configured to change the control pressure (P2) to a lower control pressure ($P2^{+}$) when the fluidic diode encounters higher viscosity fluids;

an inflow control device having a production fluid inlet operable to receive the production fluid having the pressure (P3), a control inlet operable to receive control fluid having the higher control pressure ($P2^{++}$) or the lower control pressure ($P2^{+}$), and a production fluid outlet operable to pass the production fluid having a pressure (P1) to the tubing, the inflow control device configured to close or open the production fluid outlet based upon pressure values (P3, $P2^{++}$, P1) or (P3, $P2^{+}$, P1)), wherein the flow restrictor is a first flow restrictor, and further including second and third flow restrictors placed in series with the first flow restrictor and in parallel with the fluidic diode; and producing fluid from the wellbore into the tubing, the lower viscosity fluids closing the inflow control device and the higher viscosity fluids opening the inflow control device.

* * * * *